United States Patent Office 2,854,777
Patented Oct. 7, 1958

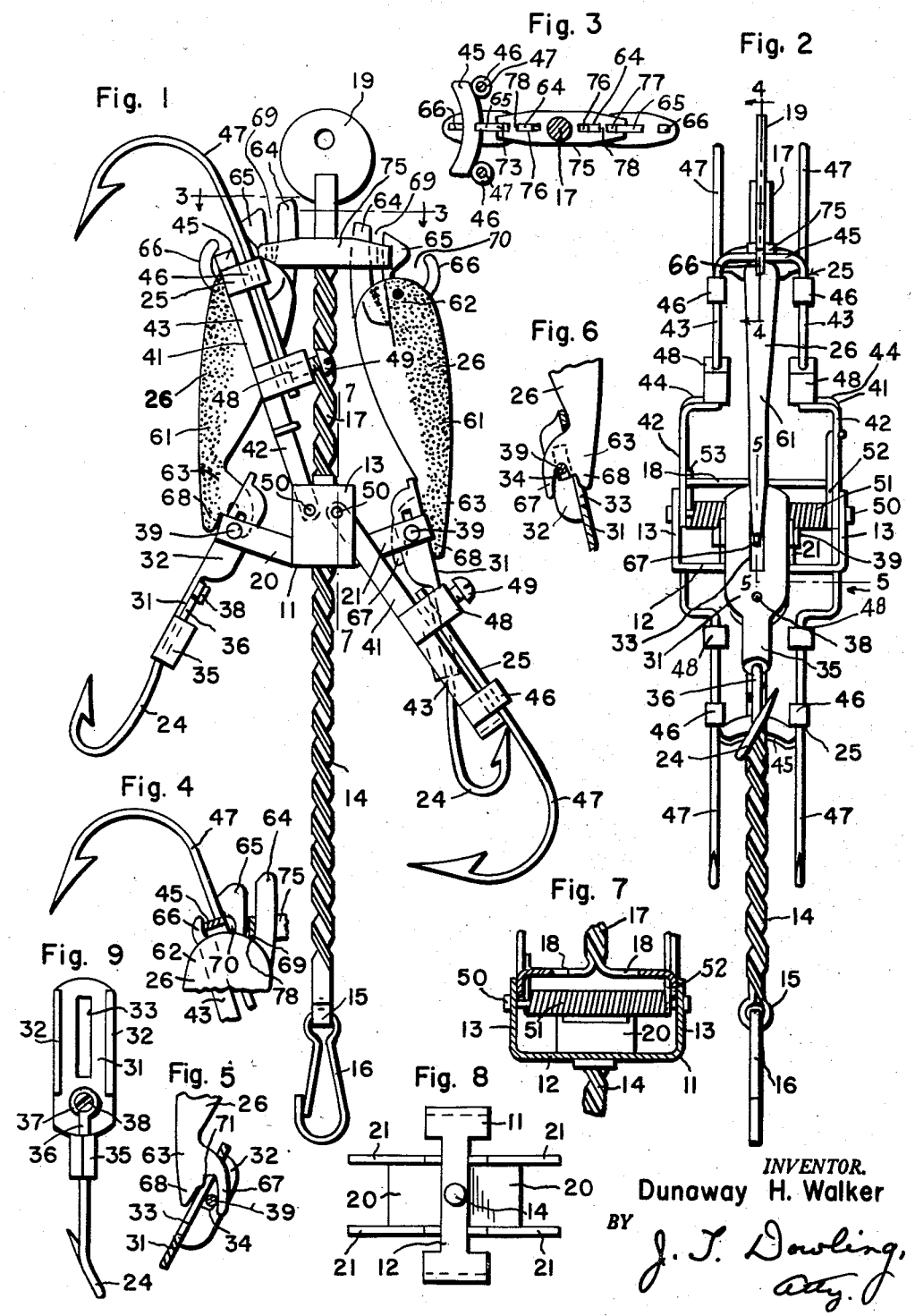

2,854,777

COMBINED FISH HOOK AND LURES

Dunaway Hundley Walker, Baltimore, Md.

Application August 20, 1954, Serial No. 451,198

2 Claims. (Cl. 43—35)

My invention relates to combined fish hooks and lures of the type in which the bait is carried by one pair of fish hooks and another pair of fish hooks are provided to grapple or snare fish caught by the bait hooks to hold the fish captive.

An object of the invention is to provide an improved combined fish hook and lure in which a supplemental fish hook in the form of a grapple or snare member is adapted to be held extended against spring tension and to be released by a trigger carried by a lure operable by the bait hook for gripping the fish and holding the same on the bait hook.

Another object of the invention is to provide an improved combined fish hook and lure in which the bait hook is adapted to be held extended in a predetermined locked position by the lure and to be released from such locked position when the bait is attacked by a fish.

A further object of the invention is to provide an improved combined fish hook and lure in which a lower bait hook and an upper grapple or snare member are both adapted to be held extended in predetermined locked positions by a lure arranged therebetween, and to be actuated when the bait on the lower fish hook is attacked by a fish to simultaneously release both the bait hook and the grapple member from locked extended position.

Another object of the invention is to provide an improved combined fish hook and lure which is characterized by a high degree of accuracy throughout its operating range, is simple in construction, and is dependable in operation.

It is to be understood that the invention is not limited to the specific construction and organization illustrated in the drawing, nor to the specific operation and use described herein for exemplification.

The invention will be best understood by reference to the following description, when taken in connection with the accompanying illustration of one specific embodiment thereof, while its scope will be more particularly pointed out in the appended claims.

In the accompanying drawing,

Figure 1 is a front elevation of a combined fish hook and lure constructed in accordance with the present invention;

Figure 2 is a side elevation of the structure shown in Figure 1;

Figure 3 is a sectional view taken along the line 3—3 of Figure 1;

Figure 4 is a fragmentary elevational view partly in section of one side of the upper portion of the lure, the elements 45 and 75 being in section substantially along line 4—4 of Figure 2;

Figure 5 is a fragmentary elevational view of the lower portion of member 61, the pin 39 and the element 31 being shown in section substantially on line 5—5 of Figure 2, showing the manner in which the bait hook is located in operating position;

Figure 6 is a view similar to Figure 5 showing the same elements in different positions when the gaffs are in downward position;

Figure 7 is a detail vertical sectional view of the supporting bracket taken substantially along line 7—7 of Figure 1;

Figure 8 is a bottom plan view of the supporting bracket, parts being omitted; and Figure 9 is a detail view looking at the inside of one of the bait hooks removed from the device.

Referring to the drawing, the improved combined fish hook and lure comprises a supporting bracket 11, having a bottom 12, and upstanding ends 13 to provide a substantially U-shaped rigid body, as shown in Figure 7.

Depending from the bottom 12 of the bracket 11, is an elongated element 14, which is formed from a flat bar bent upon itself midway of its length and having the two sections thereof face to face and twisted in the manner shown in Figure 1, the lower end of said elongated element being formed with an eye 15 for receiving a clasp 16 for a weight (not shown).

Extending upwardly from the bracket 11, is a second elongated element 17 formed from two pieces of flat bar stock arranged face to face and twisted in the manner shown in Figure 1. The lower portion of the element 17 is left untwisted and the two bars thereof are bent outwardly in opposite directions to provide a pair of laterally extending legs 18 which are secured to the upper portion of the ends 13 of the bracket 11 by welding, soldering, or the like, as seen in Figure 7. The upper end of the element 17 has an apertured plate 19 secured thereto, to which a fishing line may be secured.

As shown best in Figure 8, extending laterally outwardly in opposite directions from the central portion of the bottom 12 of the bracket 11 is a pair of plates 20, each of which terminate in the form of a pair of spaced apart upwardly extending vertically disposed arms 21, the purpose of which will be hereinafter more fully described.

Thus the bracket 11 and the elements 14, 17 and 20 provide a rigid supporting structure for the device.

The embodiment of the invention herein shown consists of two bait hooks 24, two grappling or snaring members 25, one for each bait hook, and two lures 26. These elements are constructed and arranged on opposite sides of the bracket 11, so as to provide separate means for catching and holding captive two fish. Each of these means are independently operable, and in Figure 1 of the drawing the means on one side of the device is shown with the bait hook 24 and the grappling or snaring member 25 in extended locked position, while the corresponding parts on the opposite side of the bracket are shown in released or lowered fish snaring position.

As shown in Figure 9, each bait hook 24 comprises a holder 31, preferably formed from sheet metal, and having a substantially flat somewhat rectangular main body portion and side flanges 32 arranged at right angles thereto for a portion of the length thereof. Formed along the longitudinal center line of the holder 31 is an elongated slot 33. Aligned slots 34 are formed in the side flanges 32. The lower end of the main body of the holder 31 is of tubular form, as indicated at 35, for the reception of the shank 36 of the fish hook 24. So that the fish hook can be detachably mounted in the holder 31, the upper end of the shank of said hook is formed with an eye 37 for receiving a screw 38 mounted in the holder 31. The hook 24 can be easily replaced by prying open the tube 35 and removing the screw 38. After a hook has been replaced and the screw 38 mounted on the holder the tube 35 can be closed with pliers to provide a guide for retaining the fish hook in position in the holder. Each bait hook is pivotally connected to the bracket 11 by means of a pin 39 carried by the outer end portions 21 of the plate 20 and extended through the aligned slots 34. This construction permits the bait hook to swing freely on and to move rectilinearly to a limited extent with respect to its pivot pin 39. In this way the bait hook 24 is lengthwise shiftable with respect to the bracket 11.

Each grappling or snaring member 25 comprises a frame 41 formed of side bars having an inner section 42, an outer section 43 and an intermediate section 44. The inner sections 42 of each frame 41 are spaced a greater distance apart than is the space between the outer sections 43, and the intermediate sections 44 are arranged substantially at right angles with said inner and outer sections. Connecting the ends of the outer sections 43 is a cross bar 45. Each end of the cross bar is connected to the frame 41 in such a manner as to provide a tubular member 46 which is arranged in alignment with the edge of the outer section 43. Into each tube 46 is mounted the shank of a fish hook 47. Also mounted on the outer section 43 is a block 48 having an opening formed therein in alignment with the opening in the tube 46. The shank of the fish hook 47 passes through the opening in the block 48 in the manner shown in Figure 1 and is locked in position therein by means of a set screw 49 threadedly mounted in said block. By this construction the fish hook 47 can be readily changed when desired. As shown in Figure 2, the grappling or snaring member 25 comprises a pair of spaced apart fish hooks which are arranged on opposite sides of the longitudinal center line of the device.

Each grappling or snaring member 25 is pivotally connected to the bracket 11 by means of a pin 50 carried by the upstanding ends 13 of said bracket and extending through aligned openings formed in extremities of the side bars 42.

Wound about each pivot pin 50 are the coils of a spring 51, one end of which is secured to a side bar 42, as indicated at 52, Figure 2, and the other end 53 to a leg 18, whereby as the frame 41 is raised from the lowered position shown at the right hand side of Figure 1 into the upwardly extended position shown at the left hand side of Figure 1, the spring 51 will be wound up or tightened to swing the frame 41 downward when released.

Each lure latch link 26 comprises an elongated fish-shaped body 61 having an upper end in the form of the head 62 of a fish, and the lower end 63 in the form of a tail of a fish.

A plurality of fingers 64, 65 and 66 extend upwardly from the head 62, and a pair of fingers 67 and 68 extend downwardly from the tail 63.

A notch 69 is provided between the fingers 64 and 65 and a notch 70 is provided between the fingers 65 and 66. As shown in Figure 4, the side edges of the notch 69 are relatively straight or smooth. On the other hand the finger 66 is hook-shaped so that the side edges of the notch 70 are irregular for a purpose to be hereinafter more fully described.

As shown best in Figure 5, a notch 71 having irregular side edges is formed in the tail portion of each lure between the fingers 67 and 68.

At a suitable distance above the bracket 11 the supporting element 17 carries a guide bar 75. As shown best in Figure 3, formed in the guide bar 75 at each side of the supporting element 17, are vertical slots or openings 76. A notch 77 is formed in each extremity of the guide bar. The construction and arrangement of the parts of the guide bar are such that a web 78 is provided in the guide bar between each slot 76 and each notch 77 for a purpose to be hereinafter more fully described.

Each lure latch link 26 is arranged in the device with the tail 63 straddling the pivot pin 39 of each bait hook 24, and the fingers 64 and 65 of the head 62 being engageable with the walls of the openings 76 and 77 respectively of the guide bar 75 in the manner shown in Figure 3. Thus the manner in which the lure latch link 26 is mounted in the device is such that pivot pin 39 passes through the notch 71 at the lower end of the lure, and the web 78 and cross bar 45 extend through the notches 69 and 70, respectively, at the upper end of the lure. It will also be noted that finger 64 is so disposed within the slot 76 that said finger can move lengthwise of said slot to a limited extent. When the finger 64 contacts the web 78 at one end of the slot 76, further outward swinging movement of the upper end of the lure will be prevented. Furthermore, the construction and arrangement of the parts is such that each lure latch link 26 is lengthwise shiftable to a limited extent.

When it is desired to set the device in operative position, the grappling or snaring member 25 is swung upward from the downward extending position shown at the right hand side of Figure 1 to the upward extending position shown at the left hand side of Figure 1. The link 26 is then shifted upwardly to bring the upper hook-shaped finger 66 into engagement with the cross bar 45 in the manner best shown in Figure 4 to thereby lock the grappling member in set position in the notch 70. As the link 26 is being shifted upwardly the outer arcuate edge of the finger 67 at the lower end of the lure 26 engages the end of the slot 33 of the bait hook holder 31 and this action swings the hook 24 outward to the extended position shown at the left hand side of Figure 1. In view of the fact that both bait hook 24 and the grappling or snaring member are engaged by the lure latch link 26 in the manner just described, these three elements, namely, bait hook 24, grappling or snaring member 25, and lure latch link 26, will be locked firmly together, and will remain in such locked position until a fish strikes the bait (not shown) on hook 24. When the bait hook is attacked by a fish a camming action occurs between the outer arcuate edge portion of finger 67 of the lure latch link and the holder 31 of the hook 24, with the result that the lower notched end 71 of the lure latch link descends toward pivot pin 39 from the position shown in Figure 5 to the position shown in Figure 6. As the result of this downward lengthwise shifting movement the upper end of the lure latch link 26 is disengaged from the cross bar 45. The grappling or snaring member 25 being thus released is now swung downward with great force by spring 51 toward the position shown at the lower right hand side of Figure 1. In this manner a fish on the hook 24 will be held captive by the hooks 47 of the grappling member in cooperation with hook 24.

Having thus described my invention, what I claim and desire to secure by Letters Patent is:

1. A combination hook and gaff for catching fish of the character described, comprising a supporting frame, having a means at its upper end for attaching a fishing line, a barbed bait hook having a shank associated therewith extending therefrom, means hingedly mounting the outer end of the shank on said frame to move in a predetermined arc, a spring loaded gaff member having a shank associated therewith extending outwardly therefrom, means hingedly mounting the outer end of said gaff shank to said frame adjacent the hinged point of the shank of the bait hook, the gaff being movable about a predetermined arc from the upper end of the frame downwardly under the action of the spring, and a latching means for holding the said gaff in an upper position and against the tension of the said spring, one end of the latching means being engageable with means associated with the said gaff member when the gaff is positioned at the upper end of the frame, the opposite end of the latching means having a portion connected with the hinged end of the bait hook shank for moving the latch out of engagement with the means associated with the gaff for releasing the gaff when the bait hook is moved downwardly about its hinged point, whereby the released gaff and its associated shank swing in an arc about its hinged point, the gaff and shank being moved by the said spring to a point adjacent the bait hook to engage the fish in a direction opposite to that engaged by the bait hook.

2. A fish catching device adapted to be carried on the outer end of a fishing line comprising in combination, an elongated frame having means at the upper end for connecting the same to the line, a barbed bait hook including a shank portion, means hingedly mounting said bait hook on the frame at an obtuse angle to the longitudinal axis of the frame, a spring loaded gaff member including a shank portion, means hingedly mounting said gaff member on the frame adjacent the hinged point of the bait hook, the gaff including its shank being longer than the said bait hook including its shank member, a spring associated with the said gaff and its shank for moving the said gaff and its shank about a predetermined arc, said spring being adapted to move the gaff from a point adjacent the upper end of the frame to a point adjacent the bait hook, a latching means carried on the frame for retaining the gaff in a position adjacent the upper end of the frame, means slidably mounting said latching means on the frame, one end of said latching means being engageable with means associated with the gaff for holding the said gaff against the tension of said spring, the other end of said latching means being engageable with the bait hook shank adjacent its pivot point for moving the latching means longitudinally of the frame when the bait hook and shank therefor are moved downwardly about their hinged point for releasing the gaff.

References Cited in the file of this patent

UNITED STATES PATENTS

| | | |
|---|---|---|
| 407,646 | Dunlap | July 23, 1889 |
| 839,611 | Martin | Dec. 25, 1906 |
| 1,242,469 | Penrod | Oct. 9, 1917 |
| 1,157,222 | Stilson et al. | May 9, 1939 |